US006842834B2

(12) United States Patent
Crockett et al.

(10) Patent No.: US 6,842,834 B2
(45) Date of Patent: *Jan. 11, 2005

(54) SYNCHRONIZATION AND RESYNCHRONIZATION OF LOOSELY-COUPLED COPY OPERATIONS BETWEEN A PRIMARY AND A REMOTE SECONDARY DASD VOLUME UNDER CONCURRENT UPDATING

(75) Inventors: Robert Nelson Crockett, Tucson, AZ (US); William Frank Micka, Tucson, AZ (US); Robert Wesley Shomler, Morgan Hill, CA (US); Warren Keith Stanley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/394,300

(22) Filed: Mar. 20, 2003

(65) Prior Publication Data

US 2003/0177322 A1 Sep. 18, 2003

Related U.S. Application Data

(63) Continuation of application No. 08/881,118, filed on Jun. 24, 1997, now Pat. No. 6,578,120.

(51) Int. Cl.⁷ .............................................. G06F 12/16
(52) U.S. Cl. ............................ 711/162; 711/114; 714/6
(58) Field of Search ................................. 711/112, 161, 711/162, 165, 114; 714/2, 6, 7; 709/248, 400

(56) References Cited

U.S. PATENT DOCUMENTS 4,789,986 A * 12/1988 Koizumi et al. ............ 714/797

(List continued on next page.)

OTHER PUBLICATIONS

IBM DFSMS/MVS, Remote Copy Administrator's Guide and Reference, Jul. 1996.*

"EMC Ships Mainframe Disaster Recovery Solution that Restores Data in Minutes", EMC Corporation, Hopkinton, Mass., Oct. 3, 1994, 2 pages [EMCP 00007514–7515].*

Ousterhout et al., "Beating the I/O Bottleneck: A Case for Log–Structured File Systems," Operating Systems Review, vol. 23, No. 1, ACM Press Jan. 1989, pp. 11–28.*

N. S. Prasad, "IBM Mainframes: Architecture and Design," McGraw–Hill Book Company, New York, N.Y., 1989, pp. 58–73 and 182–196.*

"The IBM 3390 Storage Control Reference," No. GA32–0099–04, International Business Machines Corporation, Tucson, Arizona, 1991, pp. 1–304.*

*Primary Examiner*—Pierre Bataille
(74) *Attorney, Agent, or Firm*—David W. Victor; Konrad Raynes & Victor LLP (57) ABSTRACT

A method for assuring consistency between a primary volume and a remote secondary volume wherein a host CPU manages track-to-track transfers using loosely-coupled, storage control unit mediated, data paths. The method includes initial volume synchronization in which concurrent updates to primary tracks are serialized by the copy progression at the secondary volume according to address. The method further includes volume resynchronization in the event of extrinsic error, fault, or the like in which the status of primary tracks updated during a volume suspension interval utilize bit maps to determine status of tracks unmodified during the suspension interval, and updated tracks and timestamps in addition to addresses. The bit maps and timestamps preserve the most recent version copy order of the tracks on the secondary volume.

30 Claims, 10 Drawing Sheets

U.S. PATENT DOCUMENTS

| | | | | |
|---|---|---|---|---|
| 5,163,148 A | * | 11/1992 | Walls | 711/162 |
| 5,263,154 A | * | 11/1993 | Eastridge et al. | 714/6 |
| 5,390,315 A | * | 2/1995 | Blandy et al. | 711/112 |
| 5,446,871 A | * | 8/1995 | Shomler et al. | 714/1 |
| 5,513,314 A | * | 4/1996 | Kandasamy et al. | 714/6 |
| 5,557,792 A | * | 9/1996 | Josten et al. | 711/113 |
| 5,574,950 A | | 11/1996 | Hathorn et al. | 710/8 |
| 5,615,329 A | * | 3/1997 | Kern et al. | 714/6 |
| 5,692,155 A | * | 11/1997 | Iskiyan et al. | 711/162 |
| 5,712,970 A | * | 1/1998 | Arnott et al. | 714/6 |
| 5,734,818 A | * | 3/1998 | Kern et al. | 714/6 |
| 5,742,792 A | * | 4/1998 | Yanai et al. | 711/162 |
| 5,761,705 A | * | 6/1998 | DeKoning et al. | 711/113 |
| 5,835,953 A | * | 11/1998 | Ohran | 711/162 |
| 5,870,537 A | * | 2/1999 | Kern et al. | 714/6 |
| 5,875,479 A | * | 2/1999 | Blount et al. | 711/162 |
| 5,928,367 A | * | 7/1999 | Nelson et al. | 714/6 |
| 6,049,890 A | * | 4/2000 | Kakuta et al. | 714/6 |
| 6,052,797 A | * | 4/2000 | Ofek et al. | 714/6 |
| 6,148,382 A | * | 11/2000 | Bitner et al. | 711/162 |
| 6,173,377 B1 | * | 1/2001 | Yanai et al. | 711/162 |

\* cited by examiner

SYNCHRONIZATION AND RESYNCHRONIZATION OF LOOSELY-COUPLED COPY OPERATIONS BETWEEN A PRIMARY AND A REMOTE SECONDARY DASD VOLUME UNDER CONCURRENT UPDATING

RELATED APPLICATIONS

This application is a continuation of U.S. Application Ser. No. 08/881,118, filed on Jun. 24, 1997, now U.S. Pat. No. 6,578,120 which Application is incorporated herein by reference in its entirety.

FIELD OF THE INVENTION

This invention relates to loosely-coupled copy operations between a primary and a remote secondary direct access storage device (DASD) through paths managed by a host CPU. More particularly, the invention relates to maintaining consistency between the primary and remote DASD volumes even when the CPU is updating the primary volume at the same time. This is critical where such updating occurs during initial primary-to-secondary volume synchronization and during resynchronization of the volumes after the occurrence of an I/O error or other outage.

DESCRIPTION OF RELATED ART

The following paragraphs summarize the prior art. First, it is well known that a CPU randomly and sequentially updates tracks of one or more DASDs in an attached cache-based, staged storage subsystem. It is further known that remote electronic copying of DASD volumes is a frequently-used strategy toward maintenance of full-time information handling system availability in the presence of fault or failure of system components. Among the several copy operations, duplexing is favored over point-in-time copying because of the very low latency when the backup is substituted for the primary volume.

The prior art further teaches that remote volume-to-volume duplexing can be made transparent to applications on the CPU and with no CPU overhead. This can be accomplished synchronously by control unit-to-control unit volume copying. However, no new CPU access of the primary volume can be made until the current update is copied to the second site. In contrast, where the remote copying is performed asynchronously by CPU-controlled paths, then the CPU access rate of the primary volume is independent of the backup copying. This is at the price of CPU copy management overhead. Lastly, it is known to use bit maps and volume addresses to place updates to primary volume tracks in a copy serial order for recording on a backup volume in a remote copy context, notwithstanding that such suffer from significant throwaway recording and overhead.

CPU Accessing Staged Storage

When an application runs on a multiprocessing CPU, such as an IBM S/390 with an MVS operating system, it will generate read or write calls for data to the operating system (OS). If the data is not present in CPU main memory, the OS will invoke an access method and establish a path to the data. The path will lead to data stored or to be written on one or more DASDs in an attached storage subsystem. The storage subsystem may be of the demand/responsive,hierarchically organized storage type. Illustratively, the IBM 3990 Model 6 storage control unit (SCU) is of that type. It includes a large multimegabyte cache, a nonvolatile store (NVS), and several redundant pathways to each of a plurality of 3390 DASDs or their equivalents.

If the application running on the S/390 has generated a read request, then the data would likely be stored in the SCU cache and transferred to main memory. Alternatively, if not in SCU cache, the read data would be staged to cache from one or more DASDs. It would then be copied to CPU main memory. In the case of an application-generated write, the changed or updated data would be moved from the host CPU main memory to the SCU cache. It would then be copied over to the NVS. This would permit the SCU to signal completion of the write operation and release the path coupling the SCU to the CPU. At a time subsequent, the data can be written out to the DASDs from NVS.

Remote Electronic Copying

Shomler et al., U.S. Pat. No. 5,446,871, "Method and Arrangement for Multi-System Remote Data Duplexing and Recovery", issued Aug. 29, 1995, emphasized that data copying as a storage function was the principle form of data preservation. According to Shomler, data copying was originally little more than an archive function. That is, trucks moved copies of magnetic tape recorded business transactions to remote mountain caves on a weekly or monthly basis such that businesses might restart in a post-nuclear holocaust era. However, today it is a necessity to maintain constant availability of data and systems. Thus, equipment and data are duplexed both locally and remotely. In this latter regard, Shomler proposed a method of remote electronic copying of locally stored DASD data using a token and unique sequence number responsive to each write operation at a primary site. His method relied upon the number and a list of items already sent to establish a sequence order, and thereby define gaps from which missing updates could be ascertained in the event of error, fault, or outage.

Even Shomler pointed out there was no single flavor of the copy function that would accommodate the relevant system and storage management factors. He listed several factors that should be considered in copy method design and use. These include: (1) protection domain (system and/or environmental failure or device and/or media failure), (2) data loss (no loss/partial loss), (3) time where copying occurs as related to the occurrence of other data and processes (point in time/real time), (4) the degree of disruption to applications executing on said computer, and (5) whether the copy is application or storage subsystem based.

Echoing Shomler's recognition for the need of several copy functions, large systems offer a suite of copy functions as an optional part of the resident operating system. One such suite is offered as part of the IBM MVS/DFSMS package. This package includes volume-to-volume copy operations under the control of the SCU, such as Dual Copy or Peer-to-Peer Remote Copy (PPRC). It also includes single or multivolume copying under host S/390 level control such as Concurrent Copying or Extended Remote Copy (XRC). Dual Copy is a local or same site volume duplexing feature usually under a RAID 1 rubric.

Synchronous Remote Copying and Concurrent Updating

Duplexing means rendering a second volume to be the mirror image of a primary volume. Remote data copying (duplexing) may be either synchronous or asynchronous. A synchronous remote copy function is termed Peer-to-Peer Remote Copy (PPRC). PPRC involves a direct path between DASD storage subsystems avoiding the host CPU. In PPRC, one or more tracks from the primary volume are copied through a first SCU. The copied tracks are then sent to a remote or secondary SCU location over a direct SCU/SCU ESCON-like channel.

Significantly, confirmation must be received by the primary site of the fact that copied tracks have been written to remote secondary NVS or DASD before terminating the path between the host CPU and the primary storage subsystem (SCU). This means that the next I/O access of the SCU cannot start until after the confirmation. This confirmation requirement substantially reduces the host/primary storage subsystem access rate. Relatedly, as the distance between the primary and secondary increases, the delay between accesses is further increased. This still further reduces the primary subsystem access rate. However, a consistent set of tracks and updates can be communicated between the SCUs with virtually no host CPU overhead and low SCU-to-SCU overhead.

In PPRC, the secondary or remote SCU must also recognize when the secondary volume is out of synchronization with the primary volume. Responsively, the primary SCU can suspend the remote copy function, mark the updates in some manner, and queue the updates for subsequent transmission to the secondary SCU. Note, new host accesses of the primary are still held up until the previous transfers (updates) have been synchronized at the secondary volume. A description of such a PPRC system with an efficient peer coupling may be found in the copending Hathorn et al. application, U.S. Ser. No. 08/782,474, "Method and Means for Bidirectional Peer-coupled Communication Across a Single ESCON Interface", filed Jan. 10, 1997.

One problem is that of serializing updates to datasets which occur during the copy interval. The serialization of write updates in such a PPRC arrangement is set out in the copending Blount et al. application, U.S. Ser. No. 08/779,577, "Method and Means for Making a Dual Volume Level Copy in a DASD Storage Subsystem Subject to Updating During the Copy Interval", filed Jan. 7, 1997.

Blount uses a bit status map of the datasets in the primary volume. For any given copy session, the counterpart bits of the datasets to be copied are turned on. As the session progresses, the bits in the session are turned off as the datasets are copied over to the secondary in map serial order. In the event that write updates are made anywhere in the primary volume, the counterpart bit is turned on if the dataset has already been copied to the secondary. During the next pass, the updated data sets with turned on bits are copied out in map serial order and their bits turned off. This results in at least two passes over the map and an appropriate serialization of copies and their updates. For purposes of this specification, a unit of storage is taken to mean a mapped unit of data and vis-à-vis.

Asynchronous Remote Copy

The asynchronous remote copy method (XRC) is a host CPU-based, duplex, volume-to-volume copy process. XRC asynchronously copies tracks and concurrent track updates on a primary volume in a DASD storage subsystem. The copies are sent through an attached CPU to a secondary volume in a remote DASD storage subsystem. The copies are transmitted over a long-haul communications path, possibly thousands of kilometers in length.

XRC has minimal impact on the host/primary SCU access rate. In the XRC copy process, an access operation (I/O) is considered completed when an update is written into non-volatile storage (NVS) at the primary site SCU or written out to the primary DASD volume. The copy process to the secondary volume is asynchronous. However, since updates occur anywhere over the primary volume during the copy interval, significant host processing software and cycles must be expended to ensure consistency.

Reference maybe made to the copending Kern et al. application, U.S. Ser. No. 08/506,590, "Asynchronous Remote Copy Session Recovery Following System or DASD Subsystem Failure", filed Jul. 25, 1995. Kern's method employs change-recording bit maps in primary DASD subsystems to keep a record by DASD track address and timestamps of tracks that have been changed. A host CPU-based software construct functioning as a cooperative system data mover (SDM) is also disclosed to copy the changes and, where appropriate, forward them to the secondary site. However, in Kern's version of XRC, attention is focused on maintaining consistency across several volumes rather than on maintaining consistency within a volume.

Occasionally, an access error or an outage may occur resulting in suspension of a copy session. On resuming a copy session, Kern's method uses the SDM, the change-recording bit maps and timestamps to identify all tracks that have changes and that may not have been copied to their secondary copy volumes. Those tracks will need to be recopied before the secondary devices can be restored to an XRC duplex state.

In most XRC session resume instances, the session resumption must be performed concurrent with the host CPU updating of primary copy DASD. This requires that the SDM (re)establish the volumes with the subsystems and accept updates from the subsystems, then correlate the time it reads each track to be recopied with changes that may be made to those tracks by application programs, discarding changes made before the track was read. In a copy session of any size, together with much application activity, this may result in the data mover having to read a number of primary updates that it will subsequently discard because they occurred before the data mover read the to-be-recopied track.

SUMMARY OF THE INVENTION

It is an object of this invention to devise a method and means to effectuate loosely-coupled copy operations between a primary and a remote secondary DASD through control unit mitigated paths managed by a host CPU.

It is a related object that such method and means maintain consistency between the primary and remote DASD volumes even when the CPU is updating the primary volume at the same time.

It is yet another related object that such method and means maintain consistency where such updating occurs during initial primary-to-secondary volume synchronization, and during resynchronization of the volumes after the occurrence of an I/O error or other outage.

It is a further object to reduce the processing overhead associated with the CPU and control units in volume resynchronizing through an efficient scheduling and copying on the secondary volume of primary track updates occurring during the resynchronizaton interval.

The foregoing objects are satisfied in an embodiment expressed as a method for maintaining consistency among DASD tracks of data on a primary volume with counterpart tracks of data on a secondary volume. In this arrangement, CPU-initiated write updates to selected ones of the tracks on the primary volume are made by way of a CPU-established path through a first mediating control unit. Similarly, copying of the primary tracks on the secondary DASD volume are made asynchronously by way of another CPU-established path through a second mediating control unit.

The first step of the method involves initially synchronizing the primary and secondary volumes over the mediated paths through the CPU by progressively copying primary tracks on the secondary in a monotonic address order.

Also, concurrently occurring updates to primary tracks are copied on the secondary volume if the address of the updated track does not exceed the copy address progression of the primary tracks recorded at the secondary volume.

The second step of the method is directed to resynchronizing the primary and secondary volumes over the mediated paths through the CPU in case of extrinsic error, fault, or the like. This is accomplished by ascertaining the status of primary tracks, primary tracks "in flight" through the volume shadowing process, and primary tracks updated during the volume suspension and scheduling, and recording on the secondary volume the most recent version copy order of the primary tracks using bit-mapped update status and timestamping.

More particularly, the first step of the method, namely that of initially synchronizing the tracks of data on the primary DASD volume with counterpart tracks on the secondary DASD volume, comprises several substeps. These substeps include reading from the primary volume of a predetermined number of tracks as a group in a monotonic address order and copying said tracks in that address order on the secondary volume. The substeps further include forming record sets of CPU-originated updates to the tracks on the primary volume and copying those record sets to the secondary volume having addresses less than the highest address of the primary track copied onto the secondary volume.

More particularly, the second step of the method, namely that of resynchronizing the tracks of data on the primary volume with counterpart tracks on the secondary volume, is responsive to the occurrence of an extrinsic error, fault, or the like. The substeps include suspending the primary volume, and continuing the bit map recording of tracks on the primary volume which change during the suspension interval. The next step is enabling the primary control unit to create record sets if updates are made to primary tracks unmodified before or during suspension. This is followed by reading the bit map status of primary tracks which were in flight or modified by the CPU during the suspension interval, and causing the primary control unit to monitor CPU updates to primary tracks within an address range containing the primary tracks modified before or during suspension.

After this, the resynchronization method requires forming record sets by the primary controller of tracks modified by CPU updates occurring after volume resynchronization has started, timestamping the record sets, and sending them to the secondary control unit. Subsequently, there occurs the step of writing out to the secondary volume by the secondary control unit of groups of tracks modified before or during the suspension interval in approximate monotonic address order and recording the timestamp associated with that group. Finally, the last step contemplates either writing out to the secondary volume by the secondary control unit of record sets of primary tracks modified after volume resynchronization has started if the highest (latest) timestamp associated with the record set occurs prior to the last timestamp recorded with groups of primary tracks modified before or during suspension or otherwise repeating the steps of writing out the primary tracks modified before or during suspension to the secondary volume and timestamp comparing until the condition is satisfied.

BRIEF DESCRIPTION OF THE DRAWING

FIGS. 8–10 illustrate the flow process of the volume resynchronization operations at the respective primary and remote secondary storage subsystems after the occurrence of an I/O error, fault, outage, or the like.

DESCRIPTION OF THE PREFERRED EMBODIMENT

The method and means of this invention comprise an initial volume synchronization step between the tracks of a primary and secondary DASD volume. This is followed by a processing steady state of causing the secondary to shadow the primary on an updated track basis. In the event that an interruption results in the secondary being inconsistent with the primary, then a volume resynchronization step is invoked. In the first step, volume synchronization is secured by managing serialization of updates and original tracks according to the copy address progress on the secondary volume. In the resynchronization step, bit maps, timestamps, etc. are used in aid of ensuring secondary volume consistency with the primary. This occurs by ascertaining the status of primary tracks updated before and during the volume suspension, and scheduling and recording on the secondary volume the most recent version copy order of the primary tracks using bit-mapped update status and timestamping.

Figure 1:
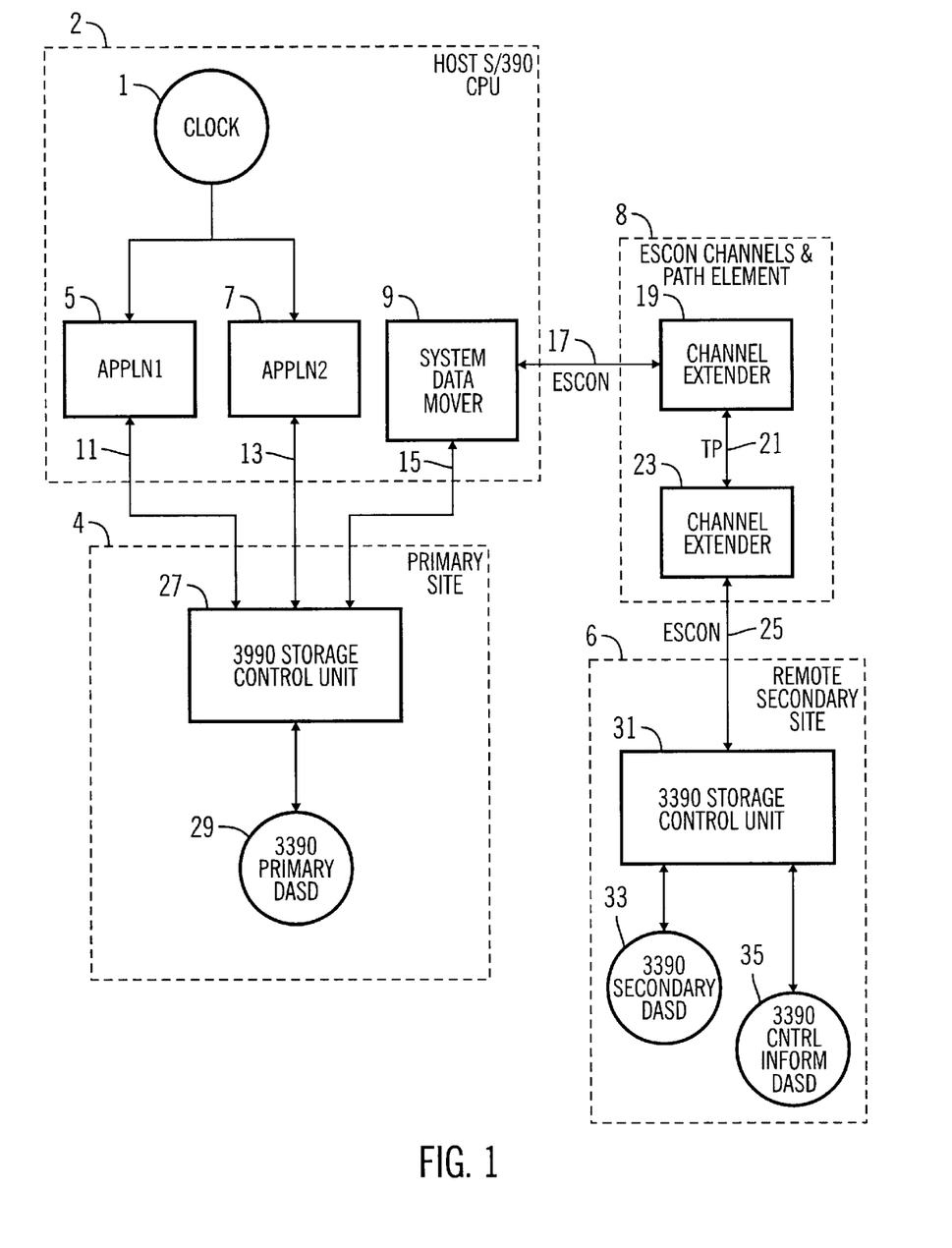
FIG. 1 shows a primary DASD storage subsystem and its logical coupling to a remote secondary DASD storage subsystem through an attached host CPU-established and maintained communications path supporting loosely-coupled copy operations.

Referring now to FIG. 1, there is shown a system having a primary multitracked DASD volume 29 and a remotely sited secondary multitracked DASD volume 33. The system further includes a first control unit 27 coupling said primary volume 29 over a multidrop line or even an SCSI interface. A second control unit 31 couples the secondary volume 33 to another volume 35 over the same interface type as used with the primary volume. The other volume 35 preferably stores control information pertinent to backing up the primary volume on the secondary. The DASD volumes can each be an IBM 3390 disk drive or equivalent, such as an IBM RAMAC DASD array.

The system preferably includes a large multiprocessing, multiprogramming computer of the IBM System/390 type. Such a CPU uses an IBM DFSMS system storage management software option with the asynchronous Extended Remote Copy function (XRC) running under an MVS operating system (OS). The CPU 2, being a multitasking machine, can concurrently process many applications 5, 7. The CPU OS also includes a software construct termed a system data mover (SDM) 9. The SDM is in the nature of a virtual processor and is tasked with supervising the movement of bit strings to and from a variety of storage subsystems. In this case, the SDM 9 is responsive to write calls from the applications 5, 7 and governs the channel paths 15 and 17. Also, the CPU 2 includes a system clock 1 for generating timestamps such that any two write calls will always have unique timestamps associated therewith.

Applications 5, 7 originate write updates. These are brought to the attention of an access method in the operating system. The access method will in effect build a channel program for writing out the updates either to the primary volume 29, directly or indirectly, by writing the updates out to a nonvolatile store (NVS) 215 on one or more primary tracks on primary volume 29. Furthermore, the CPU 2 sends the updates to selected ones of the tracks on the primary volume by way of a CPU-established path 11, 13 through the first mediating control unit 27. A primary site 4 communicates with a remote secondary site 6 over a CPU 2 managed path including a channel 15, the SDM 9, and a second path.

The second path is formed from a first ESCON channel 17, a pair of channel extenders 19, 23 terminating a long-haul telephone path 21, and a second ESCON channel 25. Each ESCON channel is a broadband fiberoptic transmission medium and coupling logic constituting a channel-to-control unit I/O interface. The channel extenders 19, 23 provide an electrical and logical signal coupling between the ESCON and any counterpart, long-haul, bilateral communications path 21. The channel extenders would preferably include pulse detection, reshaping and regeneration circuitry, impedance matching means, digital error detection and correction logic, and an appropriate signal modulation and demodulation means.

When the CPU invokes XRC as an active OS component, it facilitates the copying of ones of the tracks of the primary volume 29. It furthermore facilitates sending the copied primary tracks asynchronously by way of another CPU-established path through and including the second mediating control unit 31 and including the ESCON channels and path element 8 for writing out the primary tracks and any updates on the secondary DASD volume in the appropriate order.

Figure 2:
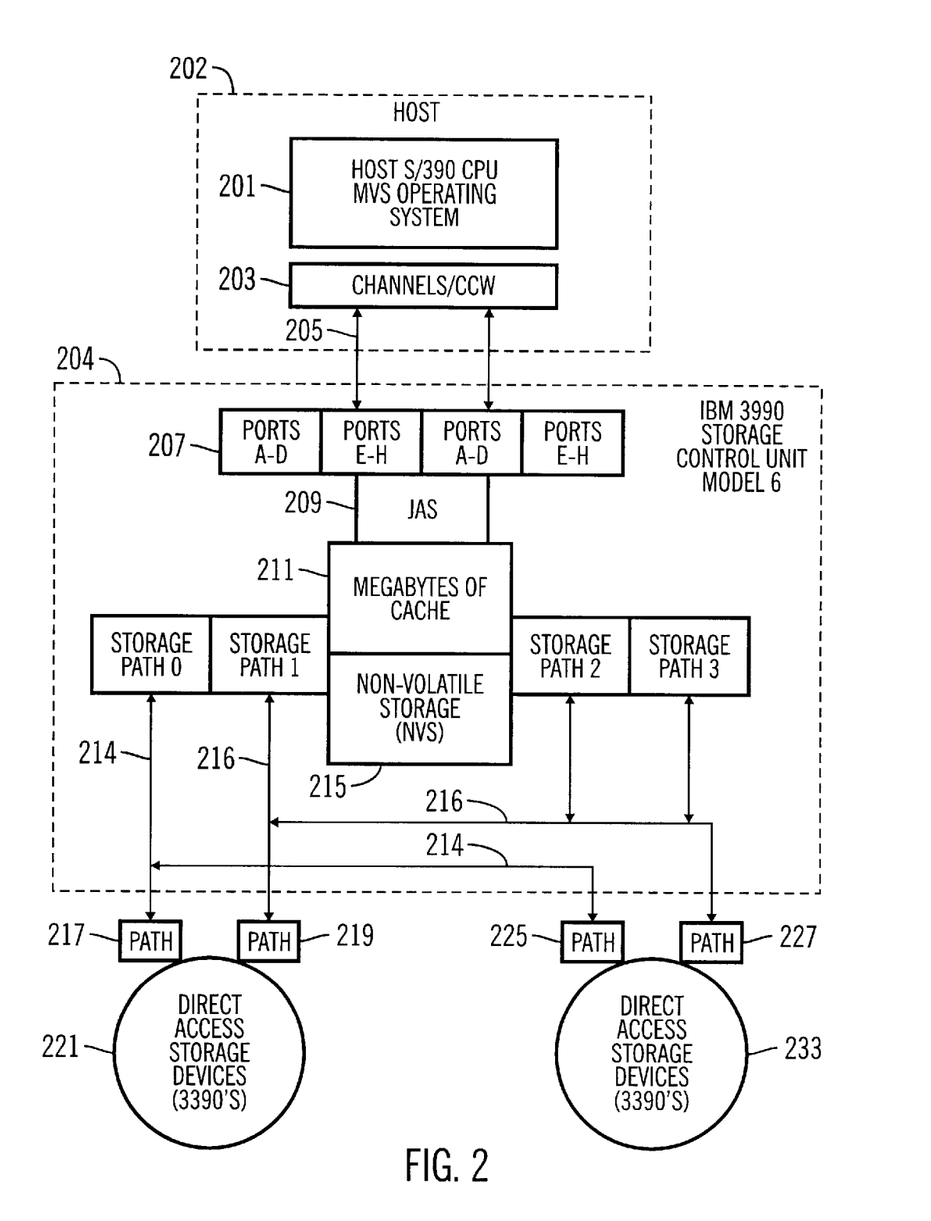
FIG. 2 is a block diagram of a host CPU processor and an attached DASD storage subsystem.

Referring now to FIG. 2, there is shown a block diagram of a host CPU processor and an attached DASD storage subsystem. Broadly, the host 202 can access any one of the DASDs 221 and 233 over at least one of a pair of paths 217, 219 or 225, 227 terminating in the respective devices. The host 202 includes an IBM S/390 processor with an MVS operating system 201 and a virtual communications processor termed a logical channel 203 which provides sequences of commands (CCWs) and sends and receives data over the coupling physical paths 205. A typical read request is presented over a channel interface 205 through any available port 207 via a chain of commands called CCWs. The CCWs are interpreted by a processor within the SCU 204 and the data located either in cache 211 or staged up at least a 3390 track at a time from the DASDs to the cache over one of the storage paths 0–3. A write request accompanied by one or more track updates is written into the cache and copied into the NVS 215. At that point, an indication of access completion sent to the host CPU. Note, the architecture provides at least two failure independent paths to each DASD directly attaching the SCU 204. Paths 214 and 216 are each cross-coupled to a pair of DASDs.

For additional description of the operation of an IBM 3990/3390 staged storage DASD subsystem as shown in FIG. 2, reference should be made to Hathorn et al., U.S. Pat. No. 5,574,950, "Remote Data Shadowing Using a Multi-mode Interface to Dynamically Reconfigure Control Link-level and Communication Link-level" issued Nov. 12, 1996, and the copending Kern et al. application, U.S. Ser. No. 08/506,590, filed Jul. 25, 1995, both incorporated by reference herein.

Initial Volume Synchronization

When a session under XRC directed to volume-to-volume copy is invoked, it is first necessary to synchronize the primary 29 and secondary 33 volumes. This is termed "initial volume synchronization" or simply "volume initialization". This consists of reading a predetermined number of tracks from the primary 29 and writing them out to the secondary 33, and repeating this read and copy operation over the entire primary volume. In order for the XRC copy operation to be transparent to executing applications, application write updates to addressed tracks on the primary volume concurrent with volume initialization must be taken into account.

Figure 3:
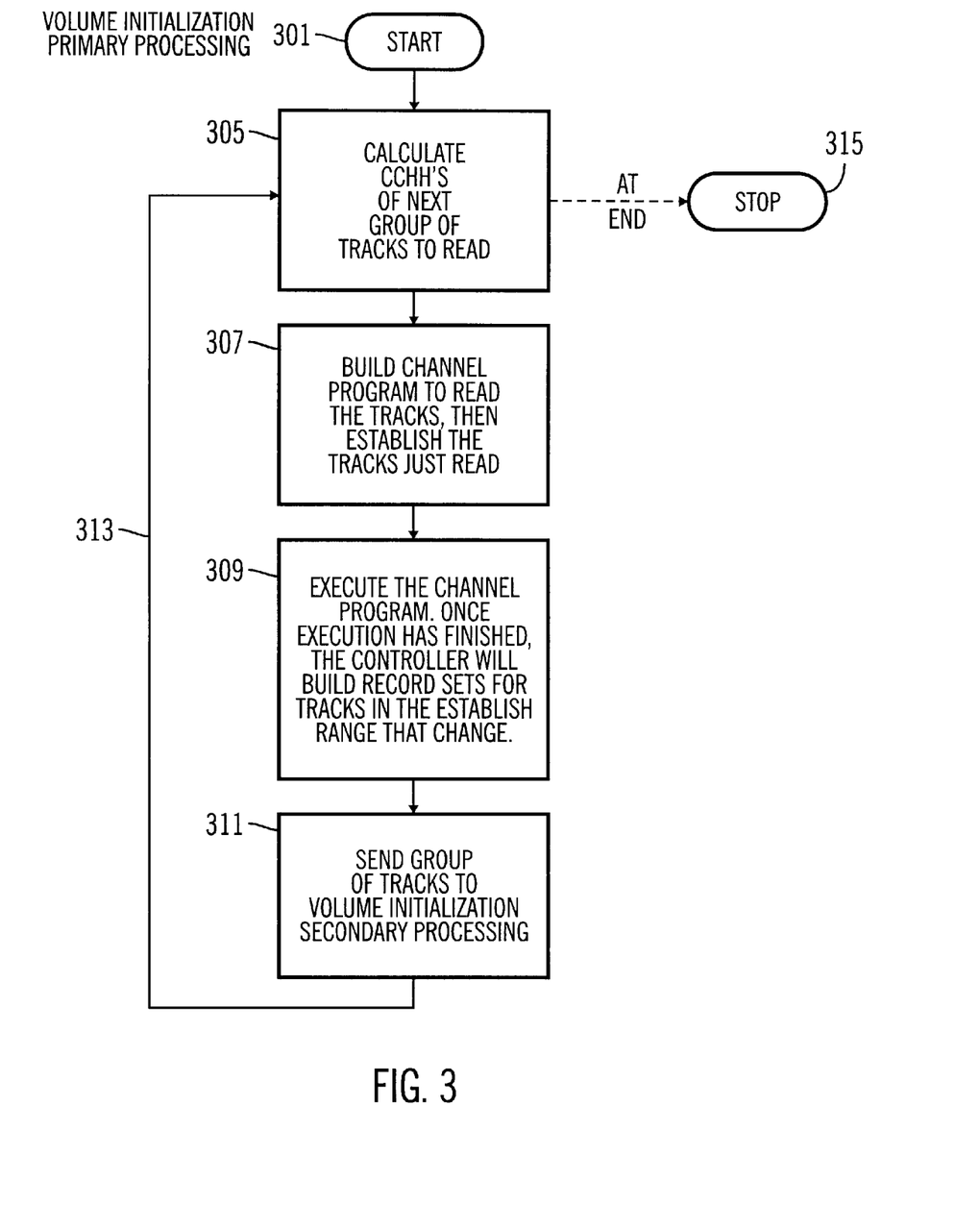
FIGS. 3 and 4 depict a flow process of volume initialization operations at the respective primary and remote secondary storage subsystems.
Figure 4:
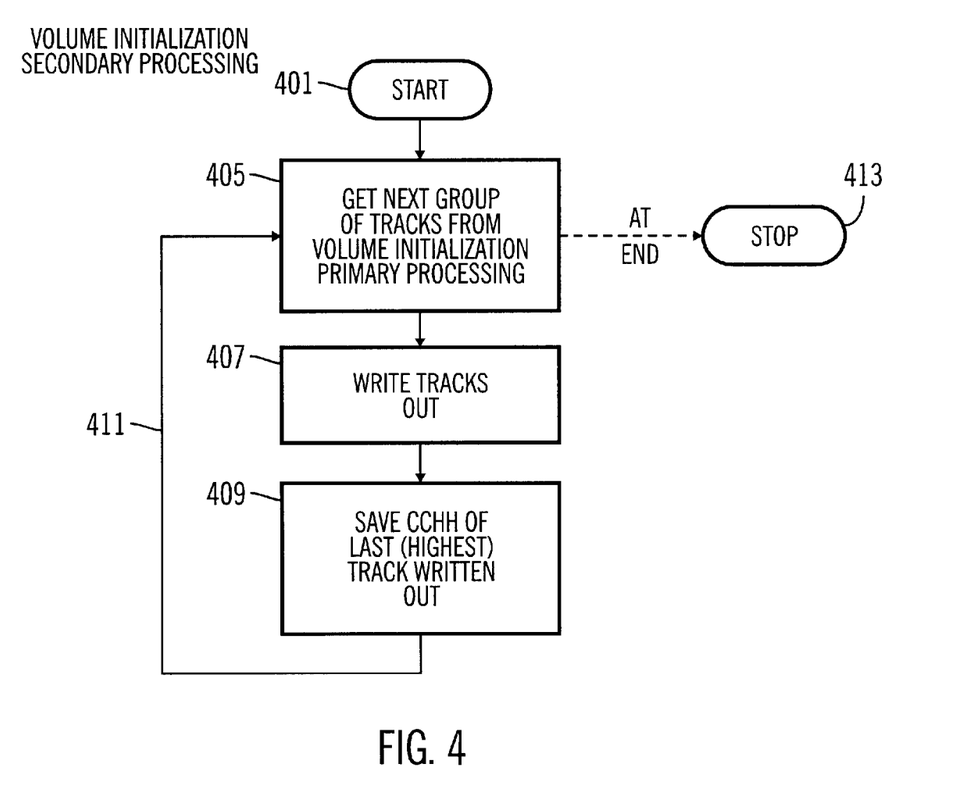

Referring now to FIGS. 3 and 4 when taken together with FIG. 1, there is shown the flow of control for the initial volume synchronization operations at primary storage subsystem 4 and at the secondary subsystem site 6.

FIG. 3 depicts the process steps at the primary site as a reiterative operation in which SCU 27 causes the tracks on the primary volume 29 to read, copied, and sent to the secondary SCU 31 in monotonic address order. One implementation could consist of computing the addresses of a predetermined number of consecutive primary tracks, say 0, 1, and 2 in step 305, reading the tracks and establishing them in step 309, and sending them to the secondary SCU in step 311. This is repeated via a branch 313 back to step 305. There, the next group of track addresses is determined again in step 305. In this case, it would be addresses for tracks 3, 4, and 5. This process would be repeated until all of the tracks on the primary volume had been copied and sent to the secondary SCU. The term "establish", as used in step 307, means that after each group of three tracks is read, the primary SCU is enabled to monitor the occurrence of any application updates to that group of primary tracks. As updates to primary tracks within the established range are detected by SCU 27, it will copy the primary track updates and form record sets thereof in step 309. The record sets in turn are sent to the secondary SCU 31 in step 311. At the termination of the volume synchronization process when all the tracks are read, the step stops at 315.

For purposes of this invention, a record set is a logical or copy set of only updates to consecutive records located on the same DASD track. If an application updates consecutive records 4, 5, and 6 on track 6, then the three updates are appended together as one record set. However, if the application updated records 5, 7, and 9 on track 6, then there would be generated three different record sets. This enables projection of data onto the secondary volume in the same way as it exists on the primary volume. It should be noted that a record set itself also contains a timestamp that is evidence of its time of creation, and the address of the track and the records that have changed.

Referring now to FIG. 4 at the secondary site 6, the process is also reiterative. In this process, the SCU 31 accepts each group of three tracks from the primary in step 405. It then writes them out to counterpart tracks in the secondary DASD volume 33 in step 407. Lastly, it saves the address of the last track written out to the secondary volume in step 409. This is repeated via loop 411 until the tracks of the primary volume have all been scanned and written to the secondary volume. This ends the volume initialization process at the secondary as provided in the stop step 413.

At volume initialization time, SCU 27 on the primary site 4 establishes a lock on a device 29. It then reads a predetermined number of tracks (i.e.,three tracks). It then establishes those tracks. In this regard, the term "establish" means that once the channel program is finished, the SCU 27 will monitor the three tracks with reference to any update activity to those three tracks. Updates to any of the "established" primary tracks will be written to the primary volume, and a record set (copy) will be made of them and sent to the secondary SCU.

More particularly, the secondary SCU, by keeping a copy of the address of the last one of the primary tracks written out to the secondary volume, can compare the address associated with the updates in record sets received from the primary SCU. If the secondary SCU writes out to the secondary volume only those record sets having update addresses LESS THAN the address of the last of the primary tracks written out to the secondary volume, this would avoid overwriting an update with an original track. If a record set has an address of an update higher than that of the last primary track written to the secondary volume, the secondary SCU waits and processes more of the primary tracks by writing out another group. It then repeats the comparison test.

Figure 5:
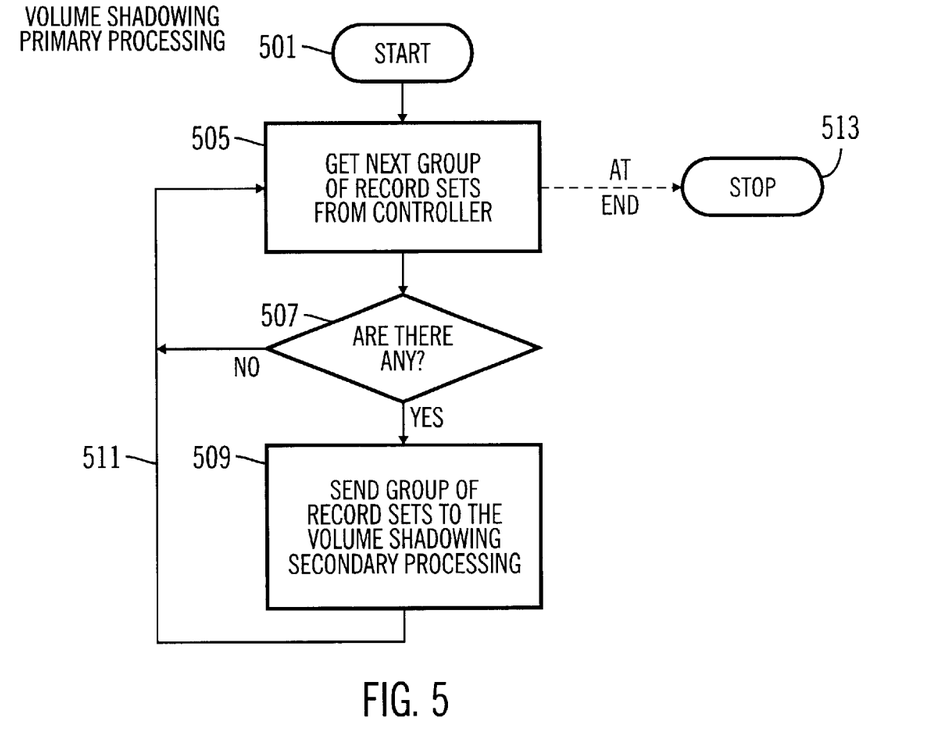
FIGS. 5–7 set out a flow process of the ordinary volume copy operations (shadowing) at the respective primary and remote secondary storage subsystems.
Figure 6:
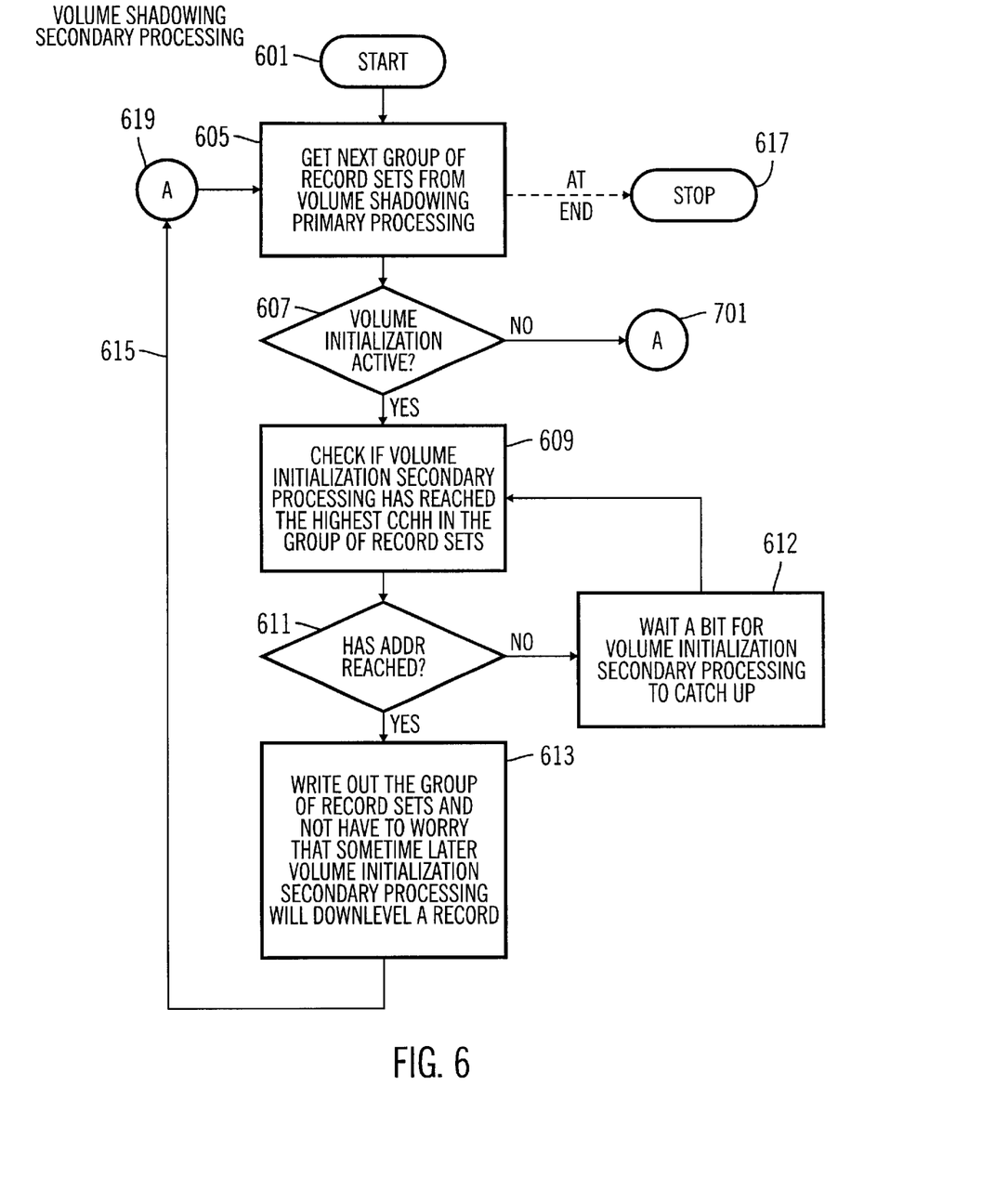
Figure 7:
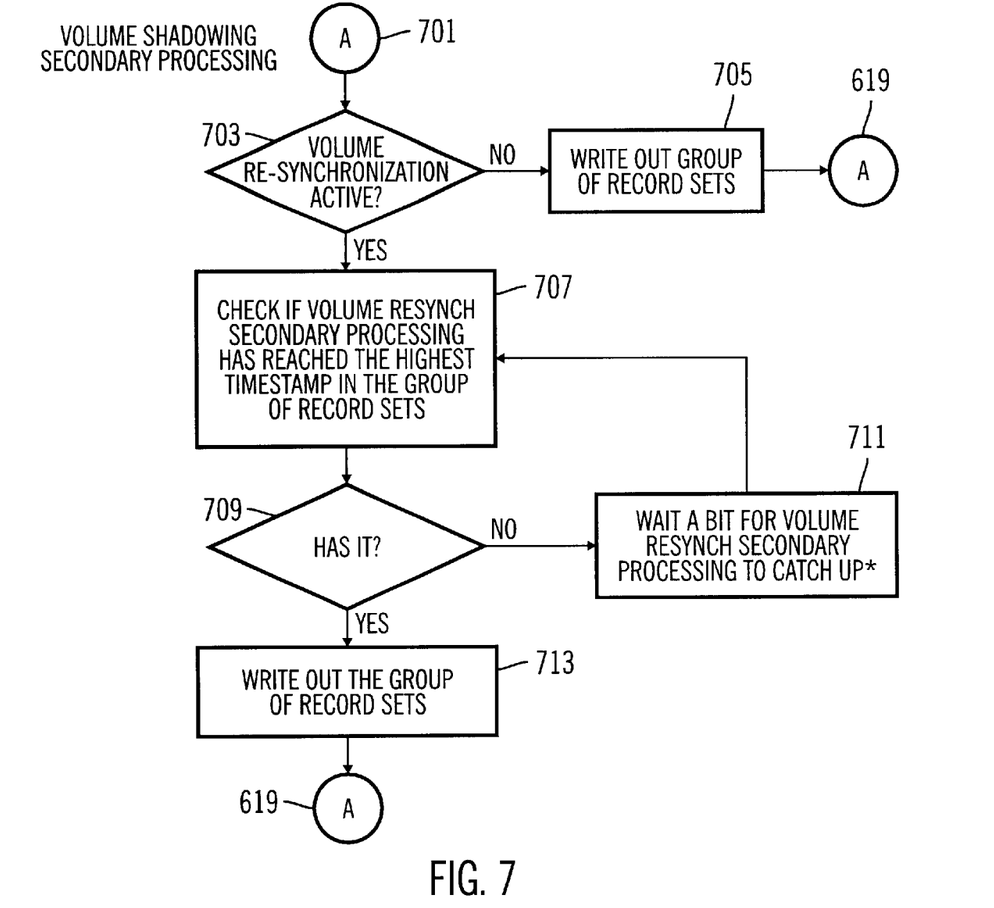

Ordinary Volume-to-Volume Steady State Copying or Shadowing after Volume Initialization Referring now to FIGS. 5–7, there are shown flow process diagrams of the ordinary volume copy operations (shadowing) at the respective primary (FIG. 5) and remote secondary (FIGS. 6–7) storage subsystems.

The method steps depicted in FIG. 5 benignly copy out from the primary SCU any record sets as they are formed and sends them to the secondary. FIGS. 6 and 7 show the serialization steps taken at the secondary SCU to assure consistency with the primary responsive to the continuing update activity at the primary and record sets sent to the secondary. Significantly, the volume initialization process uses track addresses of the initial scan compared with that of the write updates in order to serialize or defer update copying.

Turning attention to FIG. 5, the SCU 27 at the primary site invokes the volume copy routine in step 501. The flow of control depicted in this figure is directed to processing updates (record sets) against the existing tracks on primary volume 29. Following this invocation, the volume shadowing process scans whether the primary site SCU 27 has formed record sets of any updates in step 507. If not, the process uses a built-in predetermined delay of approximately four seconds and repeats a loop 511, increments the scan in step 505, and test again in step 507. If one or more record sets have been formed, they are sent to the secondary site 6 by the SDM 9 over a path including a first ESCON channel 17, the channel extender bounded long-haul path 8, and the secondary SCU 31.

Referring now to FIG. 6, let a steady state condition of applying record sets on the secondary side be assumed at the secondary site 6 after the process has been started in step 601. One consequence is the absence of volume initialization activity in step 607. This results in a branch to step 701 in FIG. 7. The process step 703 next tests whether there has been any volume resynchronization activity. If there is no such activity, all of the record sets are written out to the secondary volume 33. The process then returns to step 619 in FIG. 6, where the next group of record sets will be obtained in step 605.

Referring again to FIG. 6, assume that after the next record set is obtained in step 605 for possible writing out to the secondary, the volume initialization step 607 tests active. It should be recalled that at the end of the volume initialization process as shown in FIG. 4, step 409, the secondary site SCU 31 saved the last address of the initially read primary volume tracks written out to the secondary volume. Since the addresses are read out consecutively, the last address will also be the highest address in CCHH terms.

If the highest address associated with the record set group has gone past or exceeded the highest address of the primary tracks already written out to the secondary volume 33 per steps 609, 611, then a slight delay is incurred in step 611. This delay enables the secondary SCU to continue the writing of primary tracks to catch up. The tests in steps 609 and 611, and 612 are repeated. At the point where the last address of primary tracks written out as part of volume initialization process exceeds that of the highest address in the record set group, the record sets can be written out in step 613 and the process returned via 615 to step 605.

To recapitulate, the process in FIG. 6 occurs at the secondary site 6; the SCU 31 writes the address of the last primary track written out. Prior to writing out the record sets, SCU 31 ascertains whether the address of the tracks read during volume initialization and so far written to the secondary volume 33 has proceeded past the highest address for the record sets. If the address has not, then the update is suspended for a predetermined time and tested again. If, during the hiatus, SCU 31 has performed some volume initialization and the address has proceeded past the highest record set address, then the updates will be written out to the secondary volume. The volume shadowing process terminates at step 617.

Volume Resynchronization—I/O Error or other Interruptions of XRC Shadowing after Volume Initialization In the system such as shown in FIG. 1, applications 5, 7 are continually accessing the primary volume 29 in some statistical mix of random and sequential patterns of reads and writes. However, all systems are subject to random or systematic occurrence of error, fault, or failure of a temporary, intermittent, or permanent character. One general fault strategy is to isolate the fault and, if possible, render it transparent to an executing application. Volume resynchronization has as its object to bring the secondary volume back into consistency again with the primary while operating transparent to the applications and their write updates of the primary volume.

The process for volume resynchronization is similar to the one used for volume initialization. That is, the volume initialization process involved track addresses of the initial scan compared with those of the track addresses of write updates. This was in order to serialize or defer update copying. Also, the volume resynchronizing process uses bit maps to place the tracks and updates in correct copy order. The use of a pair of bit maps and timestamps at the primary SCU avoids overwriting track updates with an old track during the synchronization or resynchronization between primary and remote secondary volumes.

Figure 8:
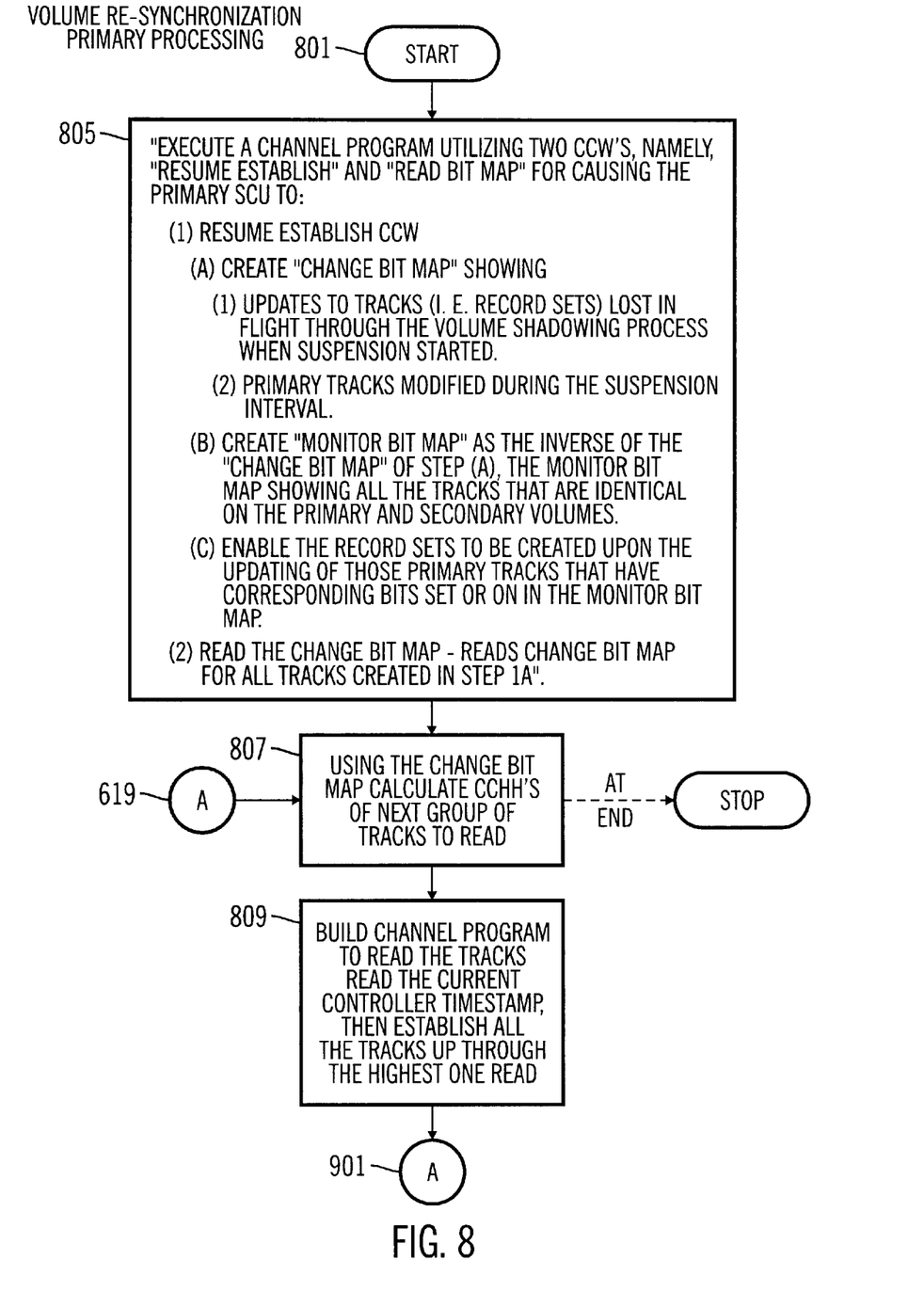
Figure 9:
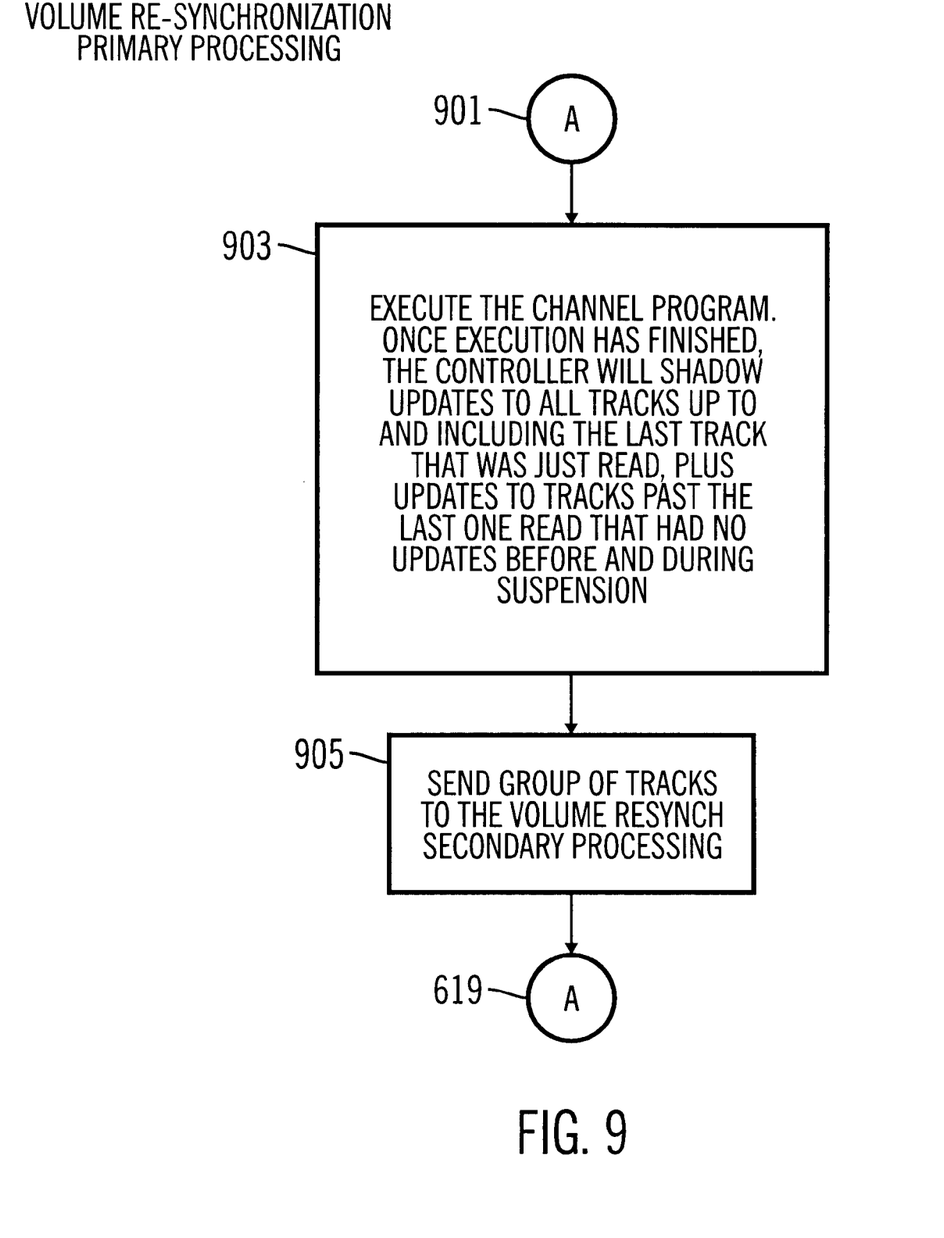
Figure 10:
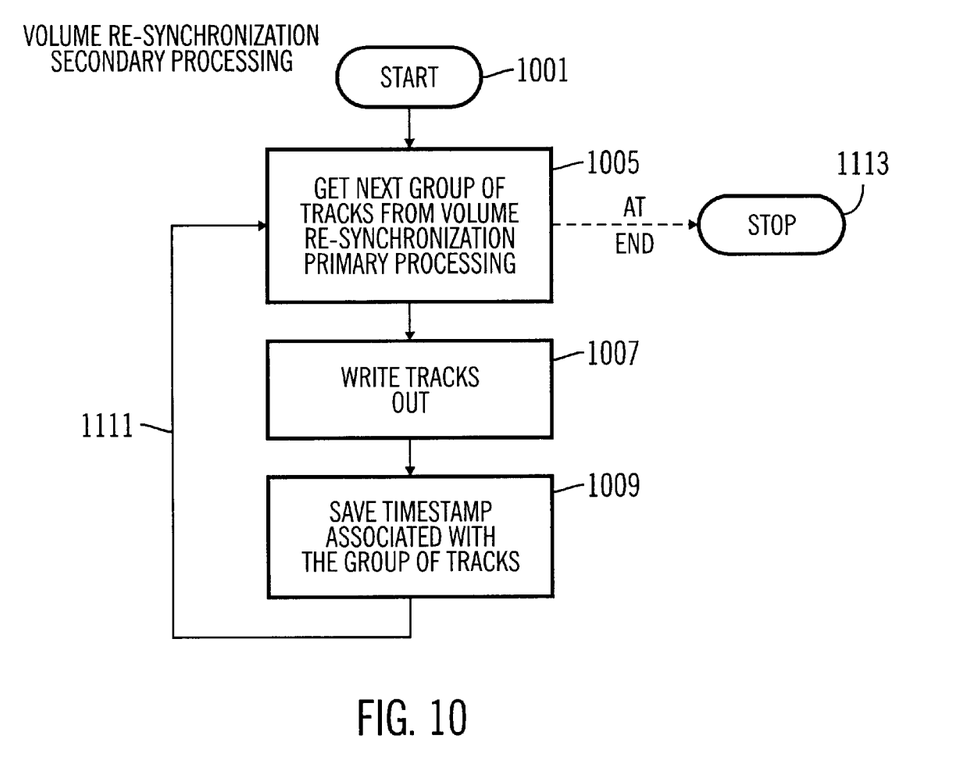

581 Referring now to FIGS. 8–10, there is shown the flow process of the volume resynchronization operations at the respective primary and remote secondary storage subsystems after the occurrence of an I/O error, fault, outage, or the like. First, responsive to an I/O error or other outage, the host CPU 2 will suspend the primary volume 29 by signaling the counterpart SCUs. The SCUs in turn are still subject to application write updates, and they in turn will operate in a type of bit map mode. However, since the primary volume 29 has been suspended, no record set copies of the write updates are made by the primary SCU 27. Restated, the suspension of the primary volume results in the primary SCU 27 operating in a "bit map mode" in which updates are made to the primary, but no record set copies are made.

Referring now to FIGS. 8 and 9, there is shown the volume resynchronization process managed at the primary SCU 27. After invocation at initialization in steps 801, the process centers on the execution of steps 805, 807, 809, and 903. First, in step 805, two CCWs are executed, namely Resume Establish and Read Bitmap.

Execution of Resume Establish results in the creation of a "change bit map" and a "monitor bit map". In this regard, a "change bit map" is a Boolean-coded status list of each of the tracks on the primary volume as to whether a track was in flight through the volume shadowing process, or has been updated or remains unmodified during suspension of the primary volume. In a "change bit map", only those tracks that change before or during the suspension will have bits turned "on". Otherwise, the bits are "off". Also, a "monitor bit map" is a Boolean-coded status list representing those tracks on the primary volume which have NOT been changed (remain unmodified) during the suspension of the primary volume. Execution of this Resume Establish CCW further enables the primary SCU to create record sets for all of the tracks of the primary volume which remain unmodified before or during the suspension of the primary volume. Lastly, the Read Bitmap CCW reads the "change bit map" representing all tracks in flight modified during the suspension of the primary volume.

Referring still again to FIG. 8, step 807 requires a determination of the volume address of each of the tracks to be read from the change bit map in step 805. After this, the primary SCU causes the tracks to be read according to their addresses and further results in the "establishment" of a range of the tracks. Thus, if tracks 3, 5, and 30 were read, then the range of tracks from 0 to 30 would be "established". The effect of "establishing" these tracks is that it turns on bits in the monitor bit map. In turn, this enables the primary SCU to create record sets for any updates to tracks whose corresponding bits are "on" in the monitor bit map and timestamp them. In step 903, the groups of primary tracks modified during the suspension and their timestamp are read and sent to the secondary SCU 31 in step 905.

Secondary Processing Toward Completion of Volume Resynchronization

Referring now to FIG. 10, there is shown the process of volume resynchronization at the secondary site. First, the secondary SCU in reiterative steps 1005–1113 receives groups of the primary tracks modified before or during suspension, writes out the groups of modified primary tracks to the secondary volume in monotonic address and timestamp order, and saves a copy of the timestamp.

Referring again to FIG. 7, there is shown the processing of record sets of primary tracks modified after the volume resynchronization period has started at the secondary SCU. More particularly, in order to obtain the next group of record sets to write out to secondary volume 33, the secondary SCU 31 branches to the process at step 701. In step 703, the volume resynchronization operation is still active so that the next steps are 707 and 709. These steps are concerned with timestamp comparison among groups of primary tracks modified before or during suspension, and with record sets of primary tracks modified after the start of resynchronization. The comparison is to assure that modified tracks will not be written over record sets on the secondary volume.

Referring now to steps 707, 709, and 711, when the secondary SCU 31 processes a group of record sets of primary tracks modified after the volume resynchronization has started, the SCU 31 will write that record set group out to the secondary volume 33 only if the associated highest timestamps bear a time PRIOR to the timestamp of the group of primary tracks modified before or during suspension written out to the secondary volume. If the timestamp of the group of record sets is LATER than the timestamp of the group of primary tracks modified before or during suspension to the secondary volume, then the secondary SCU will write out to the secondary volume one or more groups of the tracks and record the associated timestamp and repeat the comparison.

That is, to preserve the consistency between the volumes, the secondary SCU must process groups of the tracks modified before or during suspension to enable the timestamps to catch up. Lastly, completion of the writing out of the tracks would complete the resynchronization and enable the XRC to transfer to the normal volume shadowing starting at step 619 in FIG. 6.

While the invention has been described with respect to an illustrative embodiment thereof, it will be understood that various changes may be made in the method and means herein described without departing from the scope and teaching of the invention. Accordingly, the described embodiment is to be considered exemplary and the invention is not to be limited except as specified in the attached claims.

What is claimed is:

1. A method for copying data from a first storage system to a second storage system, comprising:
    copying data from storage locations in the first storage system to the second storage system;
    detecting update data to one storage location in the first storage system while copying data from storage locations in the first storage system to the second storage system;
    storing the update data to the first storage system;
    transmitting the detected update data to the second storage system; and
    applying the update data to the second storage system in a manner that maintains consistency between data copied from the storage locations and update data, wherein the update data is transmitted to the second storage system before all the data as been copied from the storage locations in the first storage system to the second storage system, and wherein the update data is capable of being applied to the second storage system while copying data from the storage locations in the first storage system to the second storage system.

2. The method of claim 1, wherein the data is copied from the storage locations during an initialization operation to copy data from storage locations in the first storage system to the second storage system to synchronize storage locations in the first and second storage systems.

3. The method of claim 1, further comprising:
    after copying data from one storage location in the first storage system to the second storage system, indicating the storage location in the first storage system as established.

4. The method of claim 3, wherein the step of detecting the update data to one storage location and transmitting the detected update data to the second storage system occurs only after the storage location to which the update data is directed is indicated as established.

5. The method of claim 1, wherein data transmitted from the storage locations in the first storage system to the second storage system comprises data stored at consecutive locations in the first storage system.

6. The method of claim 5, further comprising:
    after writing data copied from the storage locations in the first storage system to the second storage system, maintaining information indicating a last address of last data written to the second storage system as part of the copying, wherein the update is only applied to the second storage system if the update data is to an address that is less than the last address.

7. The method of claim 6, wherein the indicated last address is a highest address of data written to the second storage system as party of the copying operation, further comprising:
    if a highest address of update data exceeds the last address, then delaying applying the update data until further data is copied from the first storage system to the second storage system as part of the copying data operation such that the highest address of the update data is less than the last address of data written to the second storage system as part of the copying operation.

8. A method for copying data from a first storage system to a second storage system, comprising:

copying update data to the first storage system to the second storage system;

suspending the copying of update data from the first storage system to the second storage system;

indicating in an update data structure all storage locations in the first storage system that received updates before and during the suspension of the copying; and after ending the suspension:
  (i) copying data from storage locations in the first storage system indicated in the update data structure to the second storage system;
  (ii) transferring update data received after the suspension to storage locations in the first storage system to the second storage system; and
  (iii) applying the update data to the second storage system in a manner that maintains consistency between data copied from the storage locations that is indicated in the update data structure and update data received after the suspension.

9. The method of claim 8, wherein consistency is maintained by only applying update data to storage locations received after suspension after any update data to the storage locations indicated in the data structure is copied.

10. The method of claim 9, further comprising:

after copying update data from the storage locations indicated in the update data structure to the second storage system, maintaining information indicating a last address of the storage location to which the update data indicated in the update data structure was copied, wherein the update received after the suspension is only applied to the second storage system if the update data received after the suspension is to an address that is less than the indicated last address.

11. A system for copying data, comprising:

a first storage system;

a second storage system;

means for copying data from storage locations in the first storage system to the second storage system;

means for detecting update data to one storage location in the first storage system while copying data from storage locations in the first storage system to the second storage system;

means for storing the update data to the first storage system;

means for transmitting the detected update data to the second storage system; and means for applying the update data to the second storage system in a manner that maintains consistency between data copied from the storage locations and update data, wherein the update data is transmitted to the second storage system before all the data as been copied from the storage locations in the first storage system to the second storage system, and wherein the update data is capable of being applied to the second storage system while copying data from the storage locations in the first storage system to the second storage system.

12. The system of claim 11, wherein the data is copied from the storage locations during an initialization operation to copy data from storage locations in the first storage system to the second storage system to synchronize storage locations in the first and second storage systems.

13. The system of claim 11, further comprising:

means for indicating the storage location in the first storage system as established after copying data from one storage location in the first storage system to the second storage system.

14. The system of claim 13, wherein the means for detecting the update data to one storage location and transmitting the detected update data to the second storage system performs the detecting of the update only after the storage location to which the update data is directed is indicated as established.

15. The system of claim 11, wherein data transmitted from the storage locations in the first storage system to the second storage system comprises data stored at consecutive locations in the first storage system.

16. The system of claim 15, further comprising:

means for maintaining information indicating a last address of last data written to the second storage system as part of the copying after writing data copied from the storage locations in the first storage system to the second storage system, wherein the update is only applied to the second storage system if the update data is to an address that is less than the last address.

17. The system of claim 16, wherein the indicated last address is a highest address of data written to the second storage system as party of the copying operation, further comprising:

means for delaying applying the update data until further data is copied from the first storage system to the second storage system as part of the copying data operation if a highest address of update data exceeds the last address, wherein the highest address of the update data is less than the last address of data written to the second storage system as part of the copying operation.

18. A system for copying data, comprising:

a first storage system;

a second storage system;

means for copying update data to the first storage system to the second storage system;

means for suspending the copying of update data from the first storage system to the second storage system;

means for indicating in an update data structure all storage locations in the first storage system that received updates before and during the suspension of the copying; and means for performing after ending the suspension:
  (i) copying data from storage locations in the first storage system indicated in the update data structure to the second storage system;
  (ii) transferring update data received after the suspension to storage locations in the first storage system to the second storage system; and
  (iii) applying the update data to the second storage system in a manner that maintains consistency between data copied from the storage locations that is indicated in the update data structure and update data received after the suspension.

19. The system of claim 18, wherein consistency is maintained by only applying update data to storage locations received after suspension after any update data to the storage locations indicated in the data structure is copied.

20. The system of claim 19, further comprising:
means for maintaining information indicating a last address of the storage location to which the update data indicated in the update data structure was copied after copying update data from the storage locations indicated in the update data structure to the second storage system, wherein the update received after the suspension is only applied to the second storage system if the update data received after the suspension is to an address that is less than the indicated last address.

21. An article of manufacture for copying data from a first storage system to a second storage system, wherein the article of manufacture causes operations to be performed, the operations comprising:
copying data from storage locations in the first storage system to the second storage system;
detecting update data to one storage location in the first storage system while copying data from storage locations in the first storage system to the second storage system;
storing the update data to the first storage system;
transmitting the detected update data to the second storage system; and
applying the update data to the second storage system in a manner that maintains consistency between data copied from the storage locations and update data, wherein the update data is transmitted to the second storage system before all the data as been copied from the storage locations in the first storage system to the second storage system, and wherein the update data is capable of being applied to the second storage system while copying data from the storage locations in the first storage system to the second storage system.

22. The article of manufacture of claim 21, wherein the data is copied from the storage locations during an initialization operation to copy data from storage locations in the first storage system to the second storage system to synchronize storage locations in the first and second storage systems.

23. The article of manufacture of claim 21, further comprising:
after copying data from one storage location in the first storage system to the second storage system, indicating the storage location in the first storage system as established.

24. The article of manufacture of claim 23, wherein the step of detecting the update data to one storage location and transmitting the detected update data to the second storage system occurs only after the storage location to which the update data is directed is indicated as established.

25. The article of manufacture of claim 21, wherein data transmitted from the storage locations in the first storage system to the second storage system comprises data stored at consecutive locations in the first storage system.

26. The article of manufacture of claim 25, further comprising:
after writing data copied from the storage locations in the first storage system to the second storage system, maintaining information indicating a last address of last data written to the second storage system as part of the copying, wherein the update is only applied to the second storage system if the update data is to an address that is less than the last address.

27. The article of manufacture of claim 26, wherein the indicated last address is a highest address of data written to the second storage system as party of the copying operation, further comprising:
if a highest address of update data exceeds the last address, then delaying applying the update data until further data is copied from the first storage system to the second storage system as part of the copying data operation such that the highest address of the update data is less than the last address of data written to the second storage system as part of the copying operation.

28. An article of manufacture for copying data from a first storage system to a second storage system, wherein the article of manufacture causes operations to be performed, the operations comprising:
copying update data to the first storage system to the second storage system;
suspending the copying of update data from the first storage system to the second storage system;
indicating in an update data structure all storage locations in the first storage system that received updates before and during the suspension of the copying; and after ending the suspension:
(i) copying data from storage locations in the first storage system indicated in the update data structure to the second storage system;
(ii) transferring update data received after the suspension to storage locations in the first storage system to the second storage system; and
(iii) applying the update data to the second storage system in a manner that maintains consistency between data copied from the storage locations that is indicated in the update data structure and update data received after the suspension.

29. The article of manufacture of claim 28, wherein consistency is maintained by only applying update data to storage locations received after suspension after any update data to the storage locations indicated in the data structure is copied.

30. The article of manufacture of claim 29, further comprising:
after copying update data from the storage locations indicated in the update data structure to the second storage system, maintaining information indicating a last address of the storage location to which the update data indicated in the update data structure was copied, wherein the update received after the suspension is only applied to the second storage system if the update data received after the suspension is to an address that is less than the indicated last address.

* * * * *